United States Patent
Kuan et al.

(10) Patent No.: US 9,196,302 B1
(45) Date of Patent: Nov. 24, 2015

(54) ELECTRONIC SYSTEM WITH MEDIA MAINTENANCE MECHANISM AND METHOD OF OPERATION THEREOF

(71) Applicant: Western Digital Technologies, Inc., Irvine, CA (US)

(72) Inventors: Chin Phan Kuan, Selangor (MY); Nikki Poh Ling Khew, Selangor (MY); Wai Shin Chin, Selangor (MY)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/662,163

(22) Filed: Mar. 18, 2015

(51) Int. Cl.
G11B 21/02 (2006.01)
G11B 23/50 (2006.01)
G11B 5/55 (2006.01)
G11B 20/10 (2006.01)

(52) U.S. Cl.
CPC ............ *G11B 23/505* (2013.01); *G11B 5/5526* (2013.01); *G11B 20/10222* (2013.01)

(58) Field of Classification Search
None
See application file for complete search history.

(56) References Cited

U.S. PATENT DOCUMENTS

| | | | |
|---|---|---|---|
| 6,018,789 A | 1/2000 | Sokolov et al. |
| 6,065,095 A | 5/2000 | Sokolov et al. |
| 6,078,452 A | 6/2000 | Kittilson et al. |
| 6,081,447 A | 6/2000 | Lofgren et al. |
| 6,092,149 A | 7/2000 | Hicken et al. |
| 6,092,150 A | 7/2000 | Sokolov et al. |
| 6,094,707 A | 7/2000 | Sokolov et al. |
| 6,105,104 A | 8/2000 | Guttmann et al. |
| 6,111,717 A | 8/2000 | Cloke et al. |
| 6,145,052 A | 11/2000 | Howe et al. |
| 6,175,893 B1 | 1/2001 | D'Souza et al. |
| 6,178,056 B1 | 1/2001 | Cloke et al. |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |

(Continued)

*Primary Examiner* — K. Wong

(57) ABSTRACT

An apparatus includes: a media; a head over the media; a read channel, coupled to the head, configured to extract data from the media; control circuitry, coupled to the read channel, configured to execute a read command; and wherein the read channel is further configured to: generate, based on extracting the data from the media, a data condition indicator, and provide, for use by the control circuitry, the data and the data condition indicator.

24 Claims, 5 Drawing Sheets

(56) References Cited

U.S. PATENT DOCUMENTS

| | | |
|---|---|---|
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,754,024 B2 | 6/2004 | Suk et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,956,707 B2 * | 10/2005 | Ottesen et al. .................. 360/25 |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |

(56) References Cited

U.S. PATENT DOCUMENTS

| | | |
|---|---|---|
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,271,976 B2 | 9/2007 | Ishii et al. |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,817,370 B2 | 10/2010 | Cromer et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |

(56) References Cited

U.S. PATENT DOCUMENTS

| | | |
|---|---|---|
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 2002/0196574 A1 | 12/2002 | Suk et al. |
| 2006/0092549 A1 | 5/2006 | Ishii et al. |
| 2008/0239545 A1 | 10/2008 | Cromer et al. |
| 2009/0113702 A1 | 5/2009 | Hogg |
| 2010/0134912 A1 | 6/2010 | Koester |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2014/0201424 A1 | 7/2014 | Chen et al. |

* cited by examiner

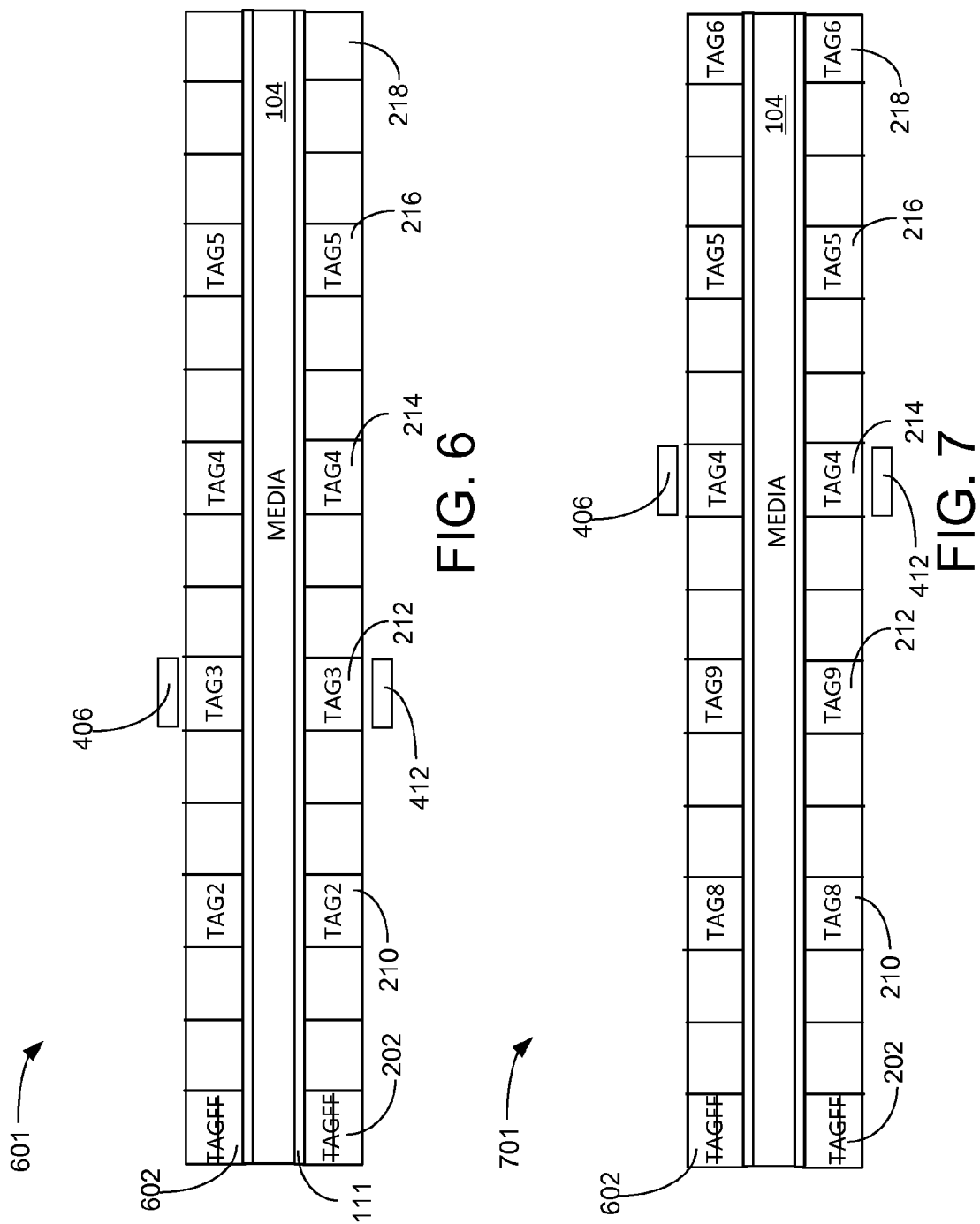

ELECTRONIC SYSTEM WITH MEDIA MAINTENANCE MECHANISM AND METHOD OF OPERATION THEREOF

TECHNICAL FIELD

An embodiment relates generally to an electronic system, and more particularly to a system for data storage and media maintenance.

BACKGROUND

Modern consumer and industrial electronic devices require storage of information, such as digital photographs, electronic mail, calendar, or contacts. These devices can be electronic systems, such as notebook computers, desktop computers, servers, televisions, and projectors, and are providing increasing levels of functionality to support modern life. Preserving the user data stored in the storage devices is of the utmost importance.

Different approaches have been used to monitor the general condition of the stored data and the media. Each of these processes must include a monitoring process that can verify all of the data has been written correctly and will be available for the user whenever it is called back-up. The logistics for such a process can be burdensome and time consuming. In some cases the data can have a limited life span and must be regenerated in order to preserve it for future use.

BRIEF DESCRIPTION OF THE DRAWINGS

FIG. 6 is a cross-sectional view of the media for a third embodiment of a media maintenance system along the section-line 4-4 of FIG. 2.

FIG. 7 is a cross-sectional view of the media for a fourth embodiment of a media maintenance system along the section-line 4-4 of FIG. 2.

DETAILED DESCRIPTION

Figure 1A:
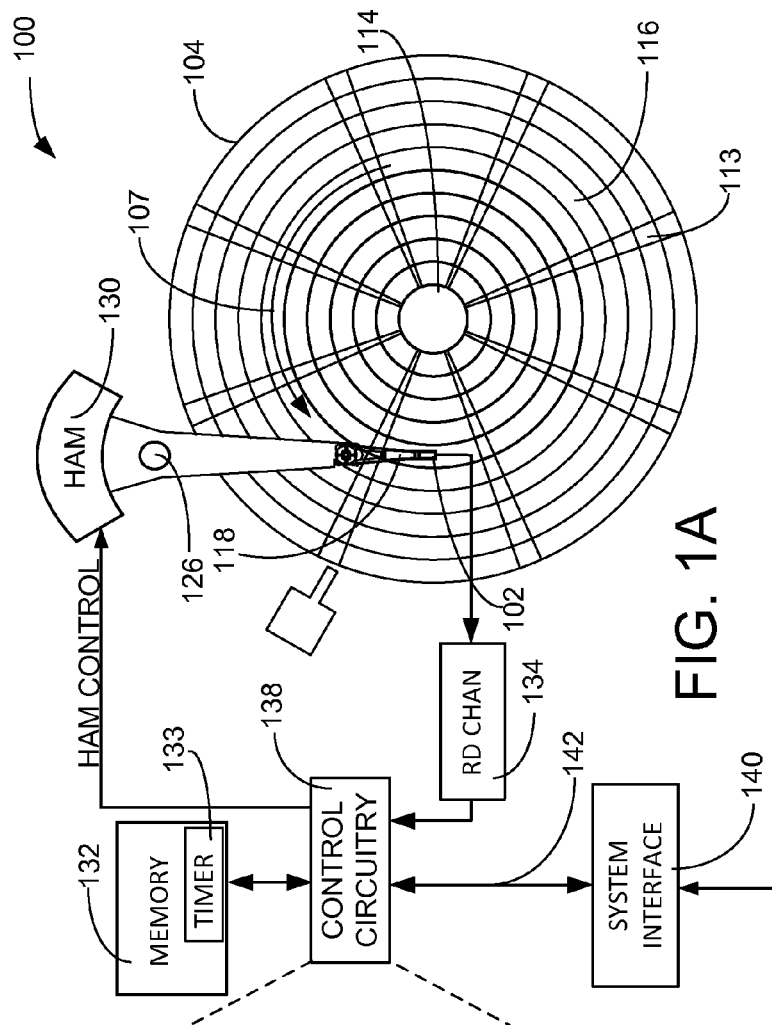
FIGS. 1A, 1B, and 1C show an operational diagram of an electronic system with media maintenance according to one of the embodiments.

Various embodiments include storage systems that can include storage devices, such as hard disk drives (HDD), solid state drives (SSD), hybrid drives, and optical storage devices. In order to maintain data integrity many of the storage devices perform off-line or background data verification and maintenance processes. These processes are typically interleaved with interface operations in order to minimize the latency seen by the storage system host.

Some embodiments solve at least this problem by establishing a timer that can prompt the control circuitry to perform media maintenance operations at appropriate intervals. The timers can be based on interface idle time, background data operations idle time, or environmental conditions. The migration of media lube layers can be detrimental to the data reliability of the storage system. If too little lube is present, the head has the potential to contact the media surface, which can damage both the head and the media. On the other hand, if too much lube is present on the surface of the media, the head will fly too high above the media, which can cause data errors due to weak writes because the head is out of range of the optimum write distance from the media. In some cases, data that was correctly written on the media can be unreadable because the thickness of the lube prevents the head from maintaining the appropriate distance from the magnetic layer of the media.

A need still remains for an electronic system as various embodiments with data management mechanism for providing reliable data while managing the migration of lube layers on the surface of the media. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

Certain embodiments have other steps or elements in addition to or in place of those mentioned above. The steps or elements will become apparent to those skilled in the art from a reading of the following detailed description when taken with reference to the accompanying drawings.

The following embodiments are described in sufficient detail to enable those skilled in the art to make and use the various embodiments. It is to be understood that other embodiments would be evident based on the present disclosure, and that system, process, or mechanical changes can be made without departing from the scope of an embodiment.

In the following description, numerous specific details are given to provide a thorough understanding of the various embodiments. However, it will be apparent that the various embodiments can be practiced without these specific details. In order to avoid obscuring an embodiment, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the embodiment can be operated in any orientation. The embodiments have been numbered first embodiment, second embodiment, etc. as a matter of descriptive convenience and are not intended to have any other significance or provide limitations for an embodiment.

Many data preservation processes can consume time, device resources, and can wear components of the device. The age and hours of operation of the electronic system can cause changes in the surface of the media that if left unchecked can cause loss of data and in the worst case damage to the electronic system that is unrecoverable.

Lube layer wear leveling solutions can execute in the background to even out media lube wear on the media surface. The control circuitry can prevent the head from staying at the same location for a long period of idle time. The control circuitry can prevent the stationary head, with no host read/write commands, by moving the head step-by-step from the outer diameter (OD) towards the inner diameter (ID) to the next wear leveling location. The movement of the head can apply pressure from the air bearing, under the head, in a direction to counter the effects of centrifugal forces on the lube layer caused by the spinning media.

Figure 1B:
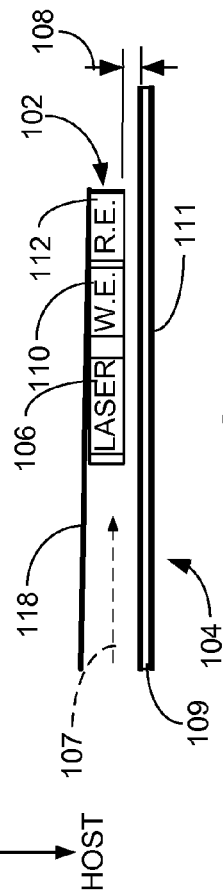
Figure 1C:
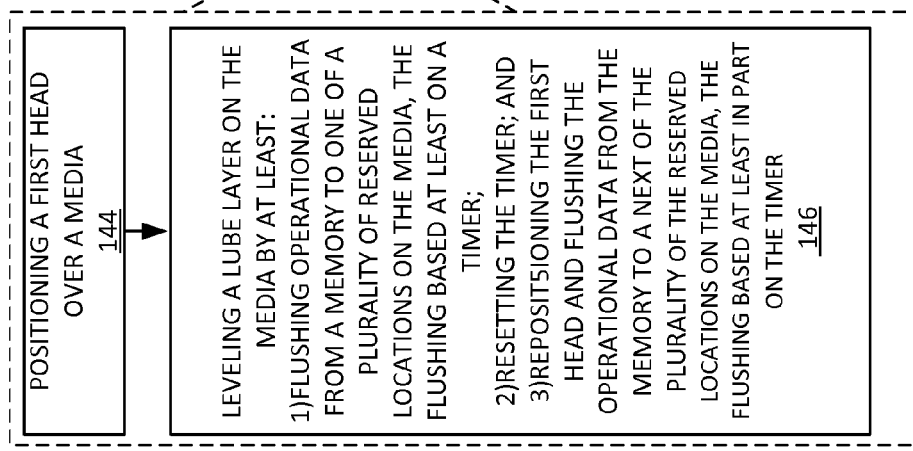

Referring now to FIGS. 1A, 1B, and 1C, therein are shown an operational diagram of an electronic system 100 according to an embodiment. The electronic system 100 can represent an apparatus for one various embodiments. An embodiment depicted in FIGS. 1A, 1B, and 1C is shown as a hard disk drive, as an example, although it is understood that the electronic system 100 as the embodiment can be a tape drive, a solid-state hybrid disk drive, or other magnetic media-based storage device. Further for example, the electronic system 100 can represent a desktop computer, a notebook computer, a server, a tablet, a television, a household appliance, or other electronic systems utilizing magnetic media storage.

In an embodiment the electronic system 100 includes a head 102 flying over a media 104. The head 102 can be mounted to a flex arm 118 attached to an actuator arm 122. The head 102 (FIG. 1B) can optionally include a laser 106 for heating the media 104 during part of a write process (e.g., the head is part of an Energy-Assisted Magnetic Recording (EAMR) drive). The flying height 108 can be adjusted (e.g., by use of a heater element in the head not shown in FIG. 1B) while writing data to the media 104 or as an error recovery process during reading from the media 104. Also in an embodiment of FIG. 1B, the head 102 comprises a write element 110 (e.g., an inductive coil) and a read element 112 (e.g., a magnetoresistive read element).

The media 104 is a structure for storing information. For example, the media 104 can be a media substrate 109 made of an aluminum alloy, ceramic/glass, or a similar non-magnetic material having a magnetic coating layer. The top and bottom surfaces of the media 104 can be covered with magnetic material deposited on one or both sides of the media 104 to form the magnetic coating layer capable of magnetization. As an example, the media 104 can be a disk platter for one embodiment of the electronic system 100 as a rotating storage system, such as a hard disk drive (HDD). As a further example, the media 104 can be a linear magnetic strip for one embodiment of the electronic system 100 as a linear storage system, such as a tape drive. The magnetic coating layer of the media substrate 109 can be covered by a lube layer 111, which acts to isolate the magnetic coating layer from contact damage.

Over time and with varying environmental conditions, the lube layers 111 can migrate toward the outer diameter of the media 104 because of the centrifugal force constantly acting on the lube layer 111 due to the spinning of the media 104. The viscosity of the lube layer 111 can make the rate of migration very low. In extreme environmental conditions or just due to age, the rate of migration of the lube layer 111 can increase and become a problem. The central region of the media 104 can be depleted of the lube layer 111 and the outer diameter can have an increased thickness to the lube layer 111. Left unchecked, this condition can render the outer diameter of the media unreadable because of an increase in the flying height 108 of the head 102. The lube layer 111 can prevent the head 102 from attaining the correct distance from the media substrate 109 making previously correctly written data unreadable.

The laser 106, as an example, can be a laser diode or other solid-state based lasers. In addition, embodiments can employ any suitable techniques for focusing the laser 106 on the media 104, such as a suitable waveguide, magnifying lens, or other suitable optics. The laser 106 is increased to a write power in order to heat the disk, thereby decreasing the coercivity of the media 104 so that the data is written more reliably.

The spindle motor 114 can rotate the media 104, about a center of the media 104, at constant or varying speed 107. For illustrative purposes, the spindle motor 114 is described as a motor for a rotation, although it is understood that the spindle motor 114 can be other actuating motors for a tape drive, as an example.

As examples, a head actuation motor 130 can be a voice coil motor assembly, a stepper motor assembly, or a combination thereof. The head actuation motor 130 can generate a torque or force for positioning the head 102.

A tapered end of the flex arm 118 can include the head 102. The flex arm 118 can be mounted to the actuator arm 122, which is pivoted around a bearing assembly 126 by the torque generated by the head actuation motor 130. The head 102 can include a single instance of the write element 110 and a single instance of the read element 112 that is narrower than the write element 110. The head 102 can fly over the media 104 at a dynamically adjustable span of the flying height 108, which represents a vertical displacement between the head 102 and the media 104. The head 102 can be positioned by the flex arm 118 and the actuator arm 122 and can have the flying height 108 adjusted by control circuitry 138.

The head 102 can be positioned over the media 104 along an arc shaped path between an inner diameter of the media 104 and outer diameter of the media 104. For illustrative purposes, the actuator arm 122 and the head actuation motor 130 are configured for rotary movement of the head 102. The actuator arm 122 and the head actuation motor 130 can be configured to have a different movement. For example, the actuator arm 122 and the head actuation motor 130 could be configured to have a linear movement resulting in the head 102 traveling along a radius of the media 104.

The head 102 can be positioned over the media 104 to create magnetic transitions or detect magnetic transitions from the media substrate 109 that can be used to representing written data or read data, respectively. The position of the head 102 and the speed 107 of the media 104 can be controlled by the control circuitry 138. Examples of the control circuitry 138 can include a processor, an application specific integrated circuit (ASIC) an embedded processor, a microprocessor, a hardware control logic, a hardware finite state machine (FSM), a digital signal processor (DSP), digital circuitry, analog circuitry, optical circuitry, or a combination thereof.

The control circuitry 138 can be coupled to a memory 132, such as a volatile memory, a nonvolatile memory, or a combination thereof. For example, the nonvolatile storage can be non-volatile random access memory (NVRAM) or Flash memory and a volatile storage can be static random access memory (SRAM) or dynamic random access memory (DRAM). The memory 132 can contain operational data, such as a file allocation table (FAT), logical to physical translation table (L2P), disk maintenance information, defect management information, and other parametric data that is key to the operation of the electronic system 100.

The control circuitry 138 can maintain a timer 133 for metering the operations of the electronic system 100. The timer 133 can be a software timer or a hardware timer available to or a part of the control circuitry 138. As such, while timer 133 is depicted as being within memory 132 in FIG. 1A, in certain embodiments it can be implemented apart from a memory such as memory 132 (e.g., in the case of a hardware timer).

The timer 133 can be a compound timer capable of monitoring several events concurrently. By way of an example, the timer 133 can implement a 5 ms disk idle timer to measure when no read or write operation is executed to the media 104. This can include any background read or write operation. Also as an example for various embodiments, the timer 133 can also implement a two-second host read or write operational timer, indicating that no host commands 142 are received through a system interface 140.

For further example, the timer 133 can be a special application timer as determined by the control circuitry 138 to respond to environmental conditions, such as temperature and humidity. The control circuitry 138 can dynamically manage the timer 133 to accommodate the requirements of the electronic system 100 concurrently.

As another example of various embodiments, the timer 133 can monitor several concurrent events and switch dynamically between active interface states, idle disk states, and environmental response states. The control circuitry 138 can configure the timer 133 and establish response vectors for each of the interrupts from the timer 133. The control circuitry 138 can utilize the timer 133 to keep track of the operational hours of the electronic system 100. The control circuitry 138 can monitor the environmental conditions and the operational hours provided by the timer 133 in order to adjust the strategy of wear leveling of the lube layer 111.

It is understood that the wear leveling of the lube layer 111 moves the head 102 in a direction or pattern that counteracts the migration of the lube layer 111. The migration of the lube layer 111 can be caused by the centrifugal force applied by the spinning of the media 104.

As the environmental conditions change, the strategy to prevent the migration of the lube layer 111 can be altered. It is understood that the migration of the lube layer 111 can be triggered by operational age and environmental conditions such as temperature and humidity.

In various embodiments, by modifying the strategy of the wear leveling of the lube layer 111, the initial migration of the lube layer 111 can be mitigated. The strategy of the wear leveling of the lube layer 111 can include long seeks of the head 102, short sweeps of the head 102, butterfly seeks of the head 102, or other movements that have a trend of movement from the outer diameter toward the inner diameter of the media 104, or vice versa.

The system interface 140 can couple the control circuitry 138 to a host or host electronics (not shown). The system interface 140 can transfer the host commands 142 between the host electronics and the control circuitry 138. The host commands 142 can be encoded or decoded by the control circuitry 138 in preparation for transfer to or from the media 104.

The control circuitry 138 can be configured to control the spindle motor 114 for adjusting the speed 107 of the media 104. The control circuitry 138 can be configured to cause the head 102 to move relative to the media 104, or vice versa. The media 104 can include a plurality of servo tracks 113 that allow the control circuitry to control the positioning of the head 102 relative to data tracks 116. The control circuitry 138 can also be configured to control the flow of information to the head 102 for writing to the data tracks 116 of the media 104.

In one embodiment, the electronic system 100 further comprises control circuitry 138 configured to execute the flow diagrams of FIG. 1C. As an example, blocks 144 to 146 can represent the flow diagram where an embodiment that is employing a media management mechanism for maintaining proper distribution of the lube layer 111 on the media 104.

Block 144 shows positioning a first head over a media for execution by the electronic system 100, such as a manufacturing test fixture, a hard disk drive, a tape drive, a hybrid drive, or an optical drive. The positioning of the first head 102 can be caused by an interface command or a background operation.

Block 146 shows leveling a lube layer on the media by at least: flushing operational data from a memory to one of a plurality of reserved locations on the media, the flushing based at least in part on a timer; resetting the timer; and repositioning the first head and flushing the operational data from the memory to a next reserved location of the plurality of the reserved locations on the media, the flushing based at least in part on the timer.

It has been discovered that an embodiment of the electronic system 100 can counteract the migration caused by the centrifugal force applied on the lube layer 111. By performing a sweeping motion across the media 104, as an example, generally toward the inner diameter of the media 104, the pressure applied by the head 102 flying over lube layer 111 can counteract the pressure to migrate the lube layer 111. The repositioning of the head 102 between a first reserved location and a next reserved location can be adjusted to optimize the effectiveness of the sweeping motion on the lube layer 111. The reserved locations are described in FIG. 2.

Figure 2:
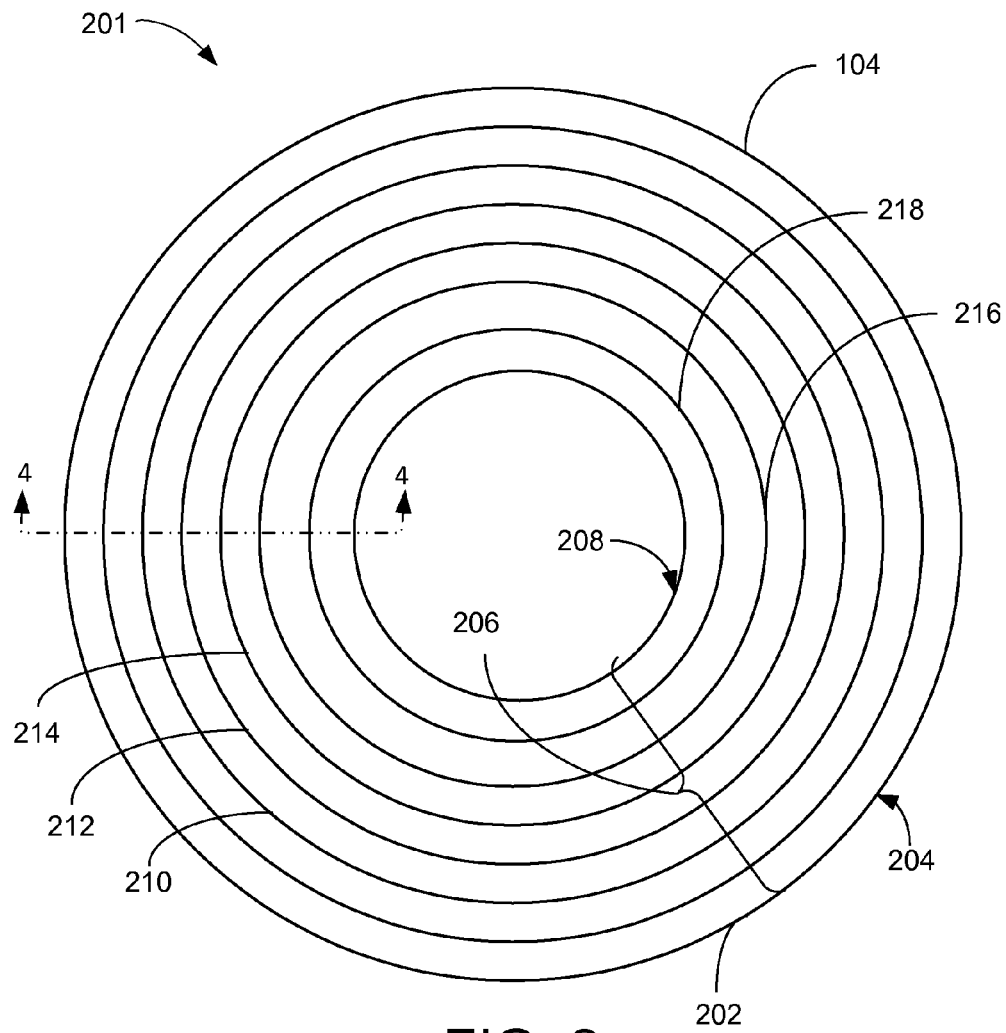
FIG. 2 provides an exemplary layout of the media for supporting the media maintenance mechanism in an embodiment.

Referring now to FIG. 2, therein is shown an exemplary layout 201 of the media 104 for supporting the media maintenance mechanism in an embodiment. The exemplary layout 201 depicts the media 104 having an outer reserved location 202 positioned substantially at an outer diameter (OD) 204. An operational area 206, such as a user capacity and a plurality of the reserved locations, can be distributed across the media 104 from the first reserved location 202 to an inner diameter (ID) 208.

The operational area 206 can include a plurality of reserved locations and user accessible storage. The plurality of reserved locations can include the outer reserved location 202, an $I^{th}$ reserved location 210, an $I+1^{th}$ reserved location 212, an $I+2^{th}$ reserved location 214, an $I+3^{th}$ reserved location 216, and an $N^{th}$ reserved location 218.

The plurality of the reserved locations can be distributed across the surface of the media 104. By way of an example, the plurality of reserved locations is shown to be evenly distributed across the surface of the media 104. It is understood that the actual position of the outer reserved location 202, the $I^{th}$ reserved location 210, the $I+1^{th}$ reserved location 212, the $I+2^{th}$ reserved location 214, the $I+3^{th}$ reserved location 216, and the $N^{th}$ reserved location 218 can be established during the manufacturing process and can be spaced as required to counteract the migration of the lube layer 111 of FIG. 1B.

Each of the outer reserved location 202, the $I^{th}$ reserved location 210, the $I+1^{th}$ reserved location 212, the $I+2^{th}$ reserved location 214, the $I+3^{th}$ reserved location 216, and the $N^{th}$ reserved location 218 can be a complete track or cylinder in the case of the electronic system 100 of FIG. 1A having multiple units of the head 102 of FIG. 1A and multiple active surfaces of the media 104. The utilization of the reserved locations to store the operational data of the electronic system 100 can complement other strategies to prevent or manage the migration of the lube layer 111.

The writing of the operational data from the memory 132 to the plurality of the reserved locations on the media is known as "flushing" the operational data. The periodic flushing of the operational data helps to protect the operational state of the electronic system 100 in the event of an unexpected power loss.

While the flushing of the operational data protects the operational state of the electronic system 100, the strategic use of the plurality of the reserved locations to perform the flushing of the operational data will also assist in the leveling of the lube layer 111 without adding additional overhead or latency to the electronic system 100. During the operation of the electronic system 100, the designation of a first reserved location and a next reserved location is established by the control circuitry 138 of FIG. 1A as selected from the list of the plurality of the reserved locations. The selection of the first reserved location and the next reserved location can be modified based on operational hours, environmental conditions, activity levels, and usage pattern analysis as performed by the control circuitry 138. Any historical or supporting data for these determinations can be part of the operational data.

It is understood that the number of the reserved locations shown is limited for ease of description. The actual number and position of the reserved locations can be different.

A section-line 4-4 indicates the cross-sectional area of view discussed in the embodiments depicted in FIGS. 4, 5, 6, 7, and 8. While it is understood the embodiments of FIGS. 4, 5, 6, 7, and 8 are different, the area of the media 104 discussed is similar.

Figure 3:
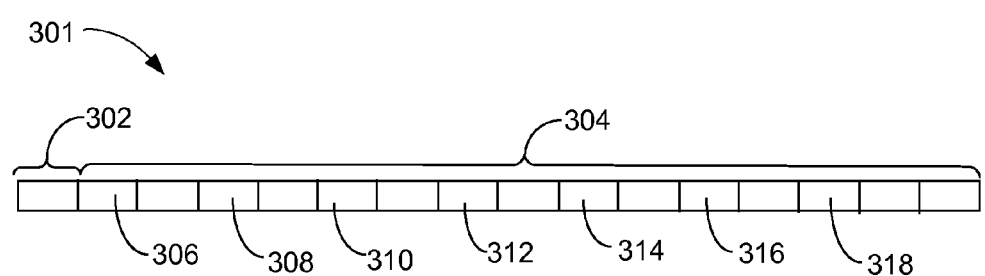
FIG. 3 is an exemplary content of a reserved location, on the media, in an embodiment.

Referring now to FIG. 3, therein is shown an exemplary content of a reserved location 301, on the media 104 of FIG. 1A, in an embodiment. The exemplary content of the reserved location 301 can be structured similar to one of the data tracks 116 of FIG. 1A.

A sequence number 302 can identify the reserved location 301 as containing the operational data 304 for a specific period of the operational time. The control circuitry 138 of FIG. 1A can maintain the operational data 304 in the memory 132 of FIG. 1A. The control circuitry 138 can periodically update the operational data 304, which can, by way of an example, include physical disk parameters 306, a file allocation table 308, a logical to physical translation table 310, usage pattern analysis 312, statistical utilization information 314, an environmental log 316, a reserved location mapping strategy 318, or a combination thereof. It is understood that the control circuitry 138 can include any additional information that can be useful in maintaining the operational state of the electronic system 100 of FIG. 1A.

The physical disk parameters 306 can include the number of the heads 102, the number of active surfaces of the media 104, the number of cylinders across the media 104, and parametric settings for controlling the flying height of each of the heads 102. The file allocation table 308 can include the number of the data tracks 116, the size of data sectors, the location of spare sectors and spare tracks. The logical to physical translation table 310 can include the map of logical block addresses and their actual location in head-cylinder-sector format. The usage pattern analysis 312 can include a historical map of which cylinders have been accessed in order to determine wear patterns in the media 104. The statistical utilization information 314 can include an analysis of the utilization of the media 104 on a cylinder basis, without regard to which surface was accessed. The environmental log 316 can include a log of temperature change during the hours of operation. The reserved location mapping strategy 318 can include the physical location of the outer reserved location 202 of FIG. 2, the $I^{th}$ reserved location 210 of FIG. 2, the $I+1^{th}$ reserved location 212 of FIG. 2, the $I+2^{th}$ reserved location 214 of FIG. 2, the $I+3^{th}$ reserved location 216 of FIG. 2, and the $N^{th}$ reserved location 218 of FIG. 2. The reserved location mapping strategy 318 can also include sequence of access of the plurality of the reserved locations and the last reserved location accessed.

The update of the memory 132 can be maintained in the memory 132 until the control circuitry 138 is ready to flush the operational data 304 to the plurality of the reserved locations. At which time an update of the sequence number 302 and the current version of the operational data 304 can be flushed to the next reserved location as selected from the outer reserved location 202, the $I^{th}$ reserved location 210, the $I+1^{th}$ reserved location 212, the $I+2^{th}$ reserved location 214, the $I+3^{th}$ reserved location 216, and the $N^{th}$ reserved location 218.

It is understood that any of the operational data for maintaining the current state of the electronic system 100 can be flushed to the plurality of the reserved locations. The order of the storage of the operational data 304 can be different. The operational data 304 can be ordered differently in the memory 132. The control circuitry 138 can choose to flush only part of the content of the memory 132 or the entire content in order to preserve the operational state of the electronic system 100.

Figure 4:
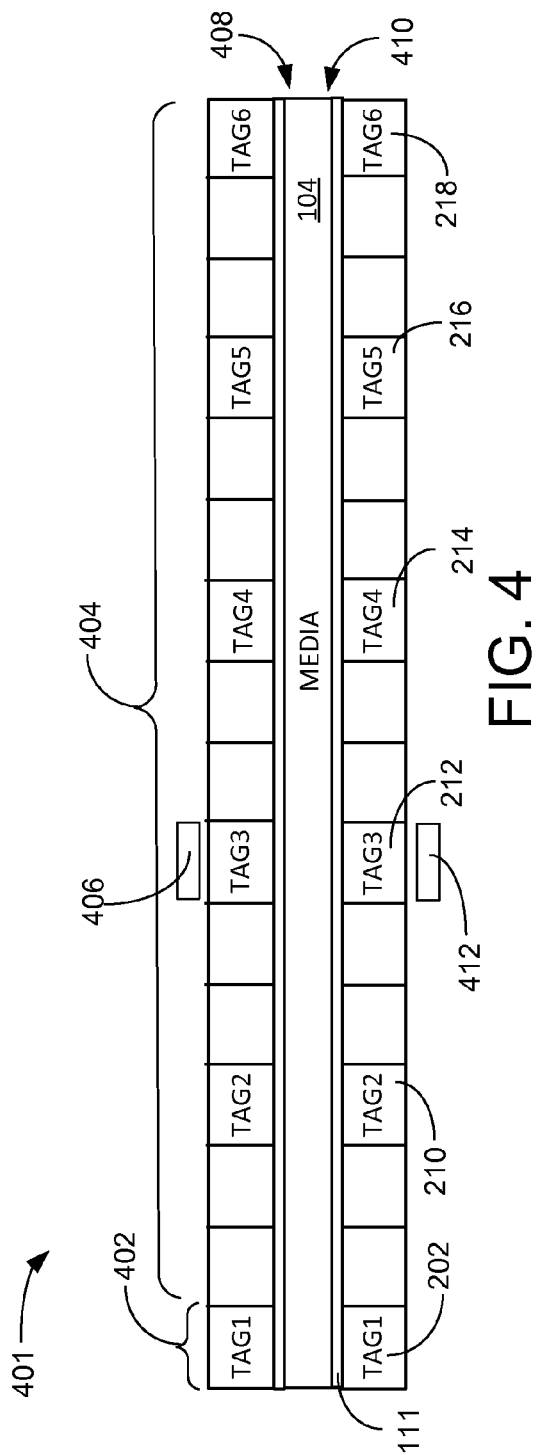
FIG. 4 provides a cross-sectional view of the media for one of the embodiments of a media maintenance system along the section-line 4-4 of FIG. 2.

Referring now to FIG. 4, therein is shown a cross-sectional view of the media 104 for of one of the embodiments of a media maintenance system 401 along the section-line 4-4 of FIG. 2. In one embodiment, the control circuitry 138 of FIG. 1A can utilize the timer 133 of FIG. 1A to manage the flushing of the operational data 304 of FIG. 3 to an outside reserved cylinder 402 and a plurality of the reserved locations 404.

By way of an example, the media 104 can have the lube layer 111 on a first surface 408 and a second surface 410. A first head 406 can operate magnetically linked to the first surface 408 of the media 104, while the second head 412 can operate magnetically linked to a second surface 410 of the media 104. It is understood that the electronic system 100 of FIG. 1A can support multiple platters of the media 104, which can be addressed by additional units of the first head 406, the second head 412, or a combination thereof.

The outer reserved location 202, the $I^{th}$ reserved location 210, the $I+1^{th}$ reserved location 212, the $I+2^{th}$ reserved location 214, the $I+3^{th}$ reserved location 216, and the $N^{th}$ reserved location 218 can be shown evenly spaced across the media 104, although the actual placement can be determined during the manufacturing process. It is understood that the plurality of the reserved locations 404 can be positioned on the first surface 408 and the second surface 410. A cylinder is formed when one of the reserved locations 404 on the first surface 408 is aligned with one of the plurality of the reserved locations 404 on the second surface 410. In an embodiment, the control circuitry 138 can designate the outer reserved location 202 as the first reserved location of the plurality of the reserved locations 404 on the media 104. Depending on the current state of the electronic system 100, the next reserved location can be any one of the $I^{th}$ reserved location 210, the $I+1^{th}$ reserved location 212, the $I+2^{th}$ reserved location 214, the $I+3^{th}$ reserved location 216, and the $N^{th}$ reserved location 218. The designation of the next reserved location can sequentially step through the $I^{th}$ reserved location 210, the $I+1^{th}$ reserved location 212, the $I+2^{th}$ reserved location 214, the $I+3^{th}$ reserved location 216, and the $N^{th}$ reserved location 218 in a circular repeating process or another strategic pattern. The control circuitry 138 can utilize a sequence number, shown as a TAG number, to identify which of the reserved locations 404 is utilized as the next reserved location. In the event of an unexpected power loss, the control circuitry 138 can search for the highest value of the sequence number to identify the reserved location that was the last written and contains the latest version of the operational data 304.

The movement of the first head 406 and the second head 412 can apply a pressure on the lube layer 111 that can counteract the centrifugal force of the spinning of the media 104. The pattern of access of the plurality of the reserved locations 404 can be altered by the control circuitry 138 based on the history of the electronic system 100 and the current environmental conditions. The strategic pattern that is used by the control circuitry 138 can be included in the operational data 304.

It is understood that while the flushing of the operational data 304 to the plurality of reserved locations on the media 104 provides an additional wear leveling of the lube layer 111, it also provides a back-up location for storing the operational data 304 required to operate the electronic system 100. Statistically most media corruption caused by head-disk interface can occur at the outer diameter of the media 104, where the system parameters are stored in traditional disk drives. By storing the operational data 304 in the plurality of the reserved locations 404, an additional layer of operational reliability can be provided. The storing the operational data 304 in the plurality of the reserved locations 404 can also provide protection from unexpected power loss that could prevent the proper shut-down of the electronic system 100, including the writing of the operational data 304 in the outer reserved location 202.

Figure 5:
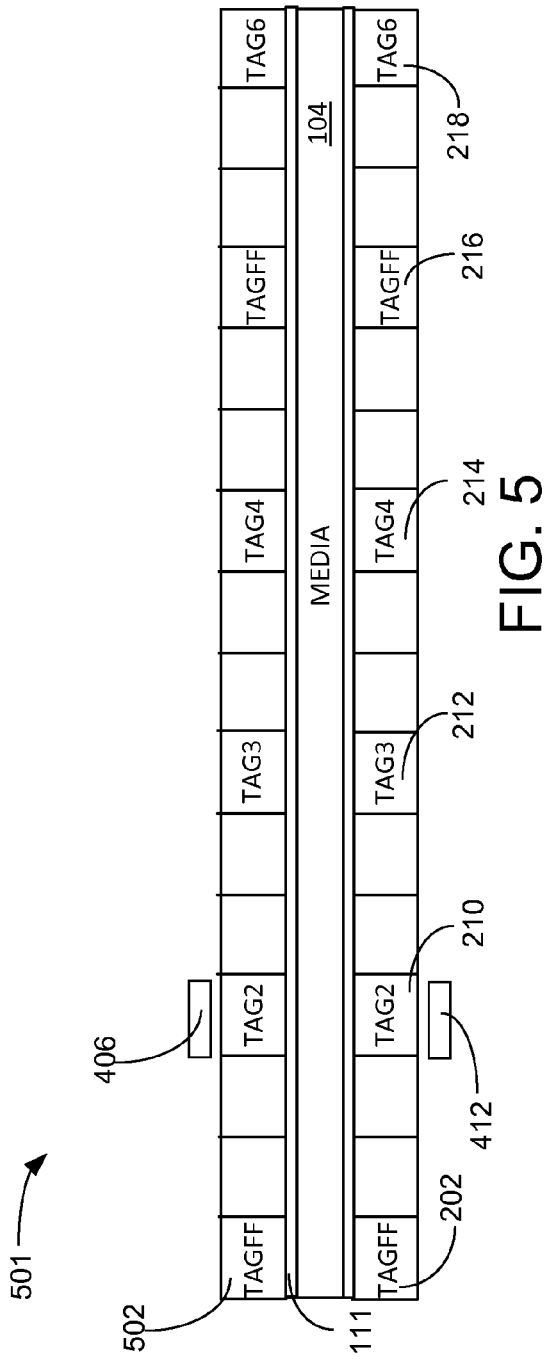
FIG. 5 is a cross-sectional view of the media for a second embodiment of a media maintenance system along the section-line 4-4 of FIG. 2.

Referring now to FIG. 5, therein is shown a cross-sectional view of the media 104 for a second embodiment of a media maintenance system 501 along the section-line 4-4 of FIG. 2. In one embodiment, the control circuitry 138 of FIG. 1A may utilize the timer 133 of FIG. 1A to manage the flushing of the operational data 304 of FIG. 3 to the plurality of the reserved locations 404 of FIG. 4.

The timer 133 can monitor the duration of time since the last occurrence of the host command 142 of FIG. 1A. By way of an example, if no host command 142 is received for 15 seconds, the first head 406 or the second head 412 can move to the next wear leveling location. However, there may not be a 15 second delay between host commands 142. By way of an example, if the host issues an additional host command 142 that arrives 14.9 seconds after the first host command 142, the traditional wear leveling does not execute since the timer 133 resets the host interface count down of 15 seconds after the additional host command 142.

In order to maintain the wear leveling of the lube layer 111, the timer 133 can also monitor an interface idle period, such as a 2 second period, after the receipt of the host commands 142. If this instance of the timer 133 is triggered, the control circuitry 138 can flush the operational data 304 to the next reserved location in order to perform the wear leveling of the lube layer 111 and provide the back-up for the operational data 304 written to the outer reserved location 202. It is understood that the next reserved location is chosen by the control circuitry 138 from the plurality of the reserved locations 404 including the $I^{th}$ reserved location 210, the $I+1^{th}$ reserved location 212, the $I+2^{th}$ reserved location 214, the $I+3^{th}$ reserved location 216, and the $N^{th}$ reserved location 218.

An additional application of the timer 133 can monitor background operations that can modify the operational state of the electronic system 100 of FIG. 1A. In an embodiment, another portion of the timer 133 can be set for a background idle period, such as a 5 ms period, from the last background operation that can write or read the media 104. The control circuitry 138 can respond to the timer 133 by flushing the operational data 304 to the first reserved location and the next reserved location. The update of the operational data 304 can be identified by the increased value of the sequence number 302 of FIG. 3. The sequence number 302 of the first reserved location and the next reserved location will be the same. The current sequence number can be maintained in the memory 132 of FIG. 1A and incremented by the control circuitry 138 for each update of the operational data 304. In all instances for this embodiment the sequence number 302 stored in the first reserved location and the next reserved location will match each other and the value in the memory 132.

In the event of a graceful power-down, a special sequence number 502 indicated by the TAGFF is used to provide a clean shut-down indicator for the electronic system 100. Upon power-on sequence, the first reserved location 202 can be read for initializing the electronic system 100. If a read error is detected when reading the first reserved location 202, the control circuitry 138 can move through the plurality of the reserved locations 404 to locate the special sequence number 502 from the next reserved location. By way of an example, the special sequence number 502 can be located in the $I+3^{th}$ reserved location 216. The operational data 304 stored in the $I+3^{th}$ reserved location 216 can be used to initialize the electronic system 100.

During a graceful shutdown, the system interface 140 of FIG. 1A can receive a flush command, a standby command, or a combination thereof. The response to the flush command or the standby command is to flush the operational data with the special sequence number 502 to the outer reserved location 202 and the next reserved location, which for this example is the $I+3^{th}$ reserved location 216. It is understood that any of the plurality of the reserved locations 404 can be the next reserved location as determined by the sequence strategy of the control circuitry 138.

It has been discovered that the media maintenance system 501 can utilize the timer 133 to trigger the wear leveling of the lube layer 111 and provide a back-up copy of the operational data 304 without adding system latency to the electronic system 100. The utilization of the special sequence number 502 to indicate a graceful shutdown can simplify the power-on initialization process. Even if the outer reserved location 202 is corrupted, the control circuitry can scan the plurality of the reserved locations 404 to locate the special sequence number 502.

Referring now to FIG. 6, therein is shown a cross-sectional view of the media for a third embodiment of a media maintenance system 601 along the section-line 4-4 of FIG. 2. The cross-sectional view of the media for the third embodiment of a media maintenance system 601 depicts erasure of the special sequence number 502 indicated by the strike-through notation TAGFF. In one embodiment this indicates that a graceful shutdown had occurred, the special sequence number 502 was read, the electronic system 100 of FIG. 1A was configured upon restart, and later the special sequence number 502 was erased to indicate a more recent copy of the operational data has been written elsewhere after the restart. Alternatively, instead of erasing the special sequencing number 502, another special sequence number 602 can be written to indicate that a more updated copy of the operational data exists elsewhere.

Upon power-on sequencing the operational data 304 of FIG. 3 can be read from the outer reserved location 202 in order to load the physical state of the electronic system 100. If the operational data 304 cannot be successfully read from the outer reserved location 202 or if the outer reserved location 202 does not contain the special sequence number 502 indicating it has the most recent copy of the data, the control circuitry 138 of FIG. 1A will scan the plurality of the reserved locations 404 of FIG. 4 to identify the most recent of the operational data 304 identified by the special sequence number 502 or the reserved location having the highest value of the sequence number 302 of FIG. 3.

Upon identifying the latest version of the operational data 304, the outer reserved location 202 can be updated to the next value of the sequence number 302. The next reserved location will also be updated to match the outer reserved location 202.

Referring now to FIG. 7, therein is shown a cross-sectional view of the media for a fourth embodiment of a media maintenance system 701 along the section-line 4-4 of FIG. 2. The cross-sectional view of the media for a fourth embodiment of a media maintenance system 701 depicts the outer reserved location 202 having the sequence number 302 of FIG. 3 that is corrupted or unreadable for some reason, erased, or can be the special sequence number 602.

The control circuitry 138 of FIG. 1A can move the first head 406 and the second head 412 across the media 104 in order to identify an inflection in the sequence number 302. The inflection in the sequence number 302 can be detected by recording the sequence number 302 of the I$^{th}$ reserved location 210, the I+1$^{th}$ reserved location 212, the I+2$^{th}$ reserved location 214, the I+3$^{th}$ reserved location 216, and the N$^{th}$ reserved location 218. When the subsequent read of the sequence number 302 of the reserved locations detects the sequence number 302 that does not increase by 1, the previous reserved location can be the latest version of the operational data 304 of FIG. 3.

By identifying the inflection in the sequence number 302, the control circuitry 138 can initialize the electronic system 100 with the current physical state of the media 104. By way of an example, the control circuitry 138 can read the I$^{th}$ reserved location 210 to detect the value TAG8 and a read of the I+1$^{th}$ reserved location 212 can detect the value TAG9. The subsequent read of the I+2$^{th}$ reserved location 214 can detect the value of TAG4. The control circuitry 138 then has determined that the inflection is at the I+1$^{th}$ reserved location 212, which contains the latest version of the operational data 304.

It has been discovered that an embodiment of the media maintenance system 701 can provide a back-up copy of the operational data 304 to assure the proper initialization of the electronic system 100. This process can identify the latest version of the operational data 304 whether there was a graceful shutdown or an unexpected power down, which can provide additional reliability that was not previously available.

Figure 8:
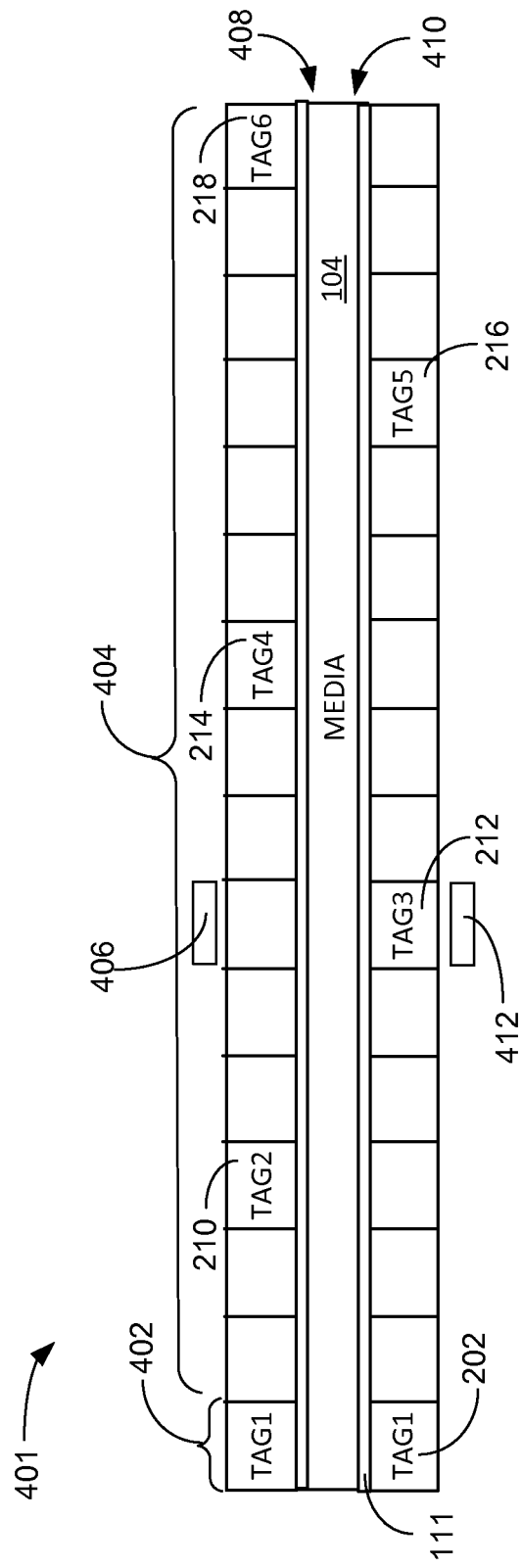
FIG. 8 is a cross-sectional view of the media for a fifth embodiment of a media maintenance system along the section-line 4-4 of FIG. 2.

Referring now to FIG. 8, therein is shown a cross-sectional view of the media for a fifth embodiment of the media maintenance system 401 along the section-line 4-4 of FIG. 2. This embodiment of the media maintenance system 401 can reduce the capacity of the media 104 consumed by the plurality of the reserved locations 404. The outside reserved cylinder 402 can represent the outside reserved location 202 on the first surface 408 and the second surface 410.

In an embodiment, each of the plurality of the reserved locations 404 can be split between the first surface 408 and the second surface 410. By way of an example, the I$^{th}$ reserved location 210, the I+2$^{th}$ reserved location 214, and the N$^{th}$ reserved location 218 can be positioned on the first surface 408, while the I+1$^{th}$ reserved location 212 and the I+3$^{th}$ reserved location 216 can be positioned on the second surface 410.

It is understood that the first head 406 and the second head 412 can move in unison. This provides the wear leveling of the lube layer 111 on both the first surface 408 and the second surface 410 at the same time, without regard to the surface on which the plurality of the reserved locations 404 are actually located.

The electronic system 100 has been described with module functions or order as an example. The embodiments of the electronic system 100 can partition the modules differently or order the modules differently. For example, the sequence of actions shown in FIG. 1C may be different in some embodiments, with some actions omitted and/or combined.

The modules described in this application can be implemented as instructions stored on a non-transitory computer readable medium to be executed by the control circuitry 138 in the electronic system 100. The non-transitory computer medium can include the memory of the integrated circuit in the electronic system 100. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the electronic system 100 or installed as a removable portion of the electronic system 100.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of various embodiments is that they valuably supports and services the historical trend of reducing costs, simplifying systems, and increasing performance.

These and other valuable aspects of the various embodiments consequently further the state of the technology to at least the next level.

While the various embodiments have been described in conjunction with a specific best mode, it is to be understood that many alternatives, modifications, and variations will be apparent to those skilled in the art in light of the aforegoing description. Accordingly, the embodiments are intended to embrace all such alternatives, modifications, and variations that fall within the scope of the included claims. All matters set forth herein or shown in the accompanying drawings are to be interpreted in an illustrative and non-limiting sense.

What is claimed is:

1. An apparatus comprising:
a media includes a lube layer on a surface;
a memory for storing operational data;
a first head over the media; and
control circuitry, coupled to the first head, configured to:
  position the first head over a first surface of the media; and
  perform a leveling of the lube layer on the surface by at least:
    flushing the operational data from the memory to a first reserved location of a plurality of reserved locations on the media, the flushing based at least in part on a timer;
    resetting the timer; and
    repositioning the head and flushing the operational data from the memory to a next reserved location of the plurality of the reserved locations on the media, the flushing based at least in part on the timer.

2. The apparatus as claimed in claim 1 further comprising a second head, wherein the control circuitry further configured to:

position the first head on the first surface of the media and the second head on a second surface of the media; and locate the plurality of the reserved locations distributed across the media on the first surface and the second surface.

3. The apparatus as claimed in claim 1 wherein the control circuitry further configured to update the operational data in the first reserved location and the next reserved location of the plurality of reserved locations.

4. The apparatus as claimed in claim 1 wherein the control circuitry further configured to locate the plurality of the reserved locations distributed on the first surface of the media.

5. The apparatus as claimed in claim 4 wherein the control circuitry further configured to locate the plurality of the reserved locations distributed between an outer diameter (OD) and an inner diameter (ID) of the media.

6. The apparatus as claimed in claim 1 wherein the control circuitry is further configured to include a sequence number in the operational data written to the first reserved location and the next of the plurality of the reserved locations on the media.

7. The apparatus as claimed in claim 1 wherein the control circuitry is further configured to execute a shutdown command including the flush of the operational data to the next of the plurality of the reserved locations on the media.

8. The apparatus as claimed in claim 1 wherein the control circuitry is further configured to read the operational data from a last written of the plurality of the reserved locations by reading a sequence number in the operational data.

9. The apparatus as claimed in claim 1 wherein the control circuitry is further configured to detect a discontinuity in a sequence number in the operational data stored in the plurality of the reserved locations.

10. The apparatus as claimed in claim 1 wherein the control circuitry is further configured to read a sequence number associated with the operational data in a last written of the plurality of the reserved locations to identify a latest version of the operational data.

11. The apparatus as claimed in claim 1 wherein the timer is based on idle time since a previous host command was received.

12. The apparatus as claimed in claim 1 wherein the timer is based on idle time since a previous read or write of the media occurred.

13. A method of operating an apparatus, the method comprising:

positioning a first head over a media; and leveling a lube layer on the media by at least:

flushing operational data from a memory to a first reserved location of a plurality of reserved locations on the media, the flushing based at least in part on a timer;

resetting the timer; and repositioning the first head and flushing the operational data from the memory to a next reserved location of the plurality of reserved locations on the media, the flushing based at least in part on the timer.

14. The method as claimed in claim 13 further comprising positioning a second head over the media opposite the head, wherein:

positioning the head over the media includes positioning a first head on a first surface of the media and positioning the second head on a second surface of the media; and locating the plurality of the reserved locations distributed across the media on the first surface and the second surface.

15. The method as claimed in claim 13 further comprising updating the operational data in the first reserved location and the next reserved location of the plurality of reserved locations.

16. The method as claimed in claim 13 further comprising locating the plurality of the reserved locations distributed on a first surface of the media.

17. The method as claimed in claim 16 wherein locating the plurality of the reserved locations includes the plurality of the reserved locations distributed between an outer diameter (OD) and an inner diameter (ID) of the media.

18. The method as claimed in claim 13 further comprising including a sequence number in the operational data written to the first reserved location and the next reserved location of the plurality of the reserved locations on the media.

19. The method as claimed in claim 13 further comprising executing a shutdown command includes flushing of the operational data to the next reserved location of the plurality of the reserved locations on the media.

20. The method as claimed in claim 13 further comprising reading the operational data from a last written of the plurality of the reserved locations by reading a sequence number in the operational data.

21. The method as claimed in claim 13 further comprising detecting a discontinuity in a sequence number in the operational data stored in the plurality of the reserved locations.

22. The method as claimed in claim 13 further comprising reading a sequence number associated with operational data in a last written of the plurality of the reserved locations to identify a latest version of the operational data.

23. The method as claimed in claim 13 further comprising basing the timer on idle time since a previous host command was received.

24. The method as claimed in claim 13 further comprising basing the timer on idle time since a previous read or write of the media occurred.

* * * * *